US005866223A

United States Patent [19]

Kolton et al.

[11] Patent Number: 5,866,223

[45] Date of Patent: Feb. 2, 1999

[54] MARKETING INDICATOR ASSEMBLY AND ARTICLE COMBINED THEREWITH

[75] Inventors: Chester Kolton, Westfield; Stuart S. Spater, Livingston, both of N.J.

[73] Assignee: B&G Plastics, Inc., Newark, N.J.

[21] Appl. No.: 842,739

[22] Filed: Apr. 16, 1997

[51] Int. Cl.[6] .......... B32B 9/00

[52] U.S. Cl. .......... 428/41.08; 428/40.1; 428/202; 283/81; 283/101; 283/108; 40/630

[58] Field of Search .......... 283/81, 101, 108; 428/40.1, 41.8, 202; 40/630

[56] References Cited

U.S. PATENT DOCUMENTS 4,631,845 12/1986 Samuel et al. .......... 40/2 R 5,284,363 2/1994 Gartner .......... 283/81

*Primary Examiner*—Bruce Hess

*Assistant Examiner*—Abraham Bahta

*Attorney, Agent, or Firm*—Robin, Blecker & Daley

[57] ABSTRACT

A marketing indicator assembly is comprised of an integral elongate sheet member of synthetic plastic material having first and second longitudinally spaced ends, a marketing indicator secured to the sheet member and extending there-with from the sheet member second end to a preselected location spaced from the sheet member second end, an end portion of the marketing indicator at the preselected location being not secured to the sheet member and bearing an adhesive layer, and a removable member secured to the adhesive layer and in facing relation to the sheet member.

16 Claims, 5 Drawing Sheets

MARKETING INDICATOR ASSEMBLY AND ARTICLE COMBINED THEREWITH

FIELD OF THE INVENTION

This invention relates generally to improved practices in imparting marketing information to articles and pertains more particularly to improved marketing indicator assemblies.

BACKGROUND OF THE INVENTION

For purposes of indicating marketing parameters, e.g., article manufacturer, price, size and the like, longstanding conventional practice involves the use of a so-called "swift tacks" involving a plastic filament which is passed through an opening in a paper or cardboard UPC (universal product code) tag or ticket and then secured at filament ends to remain with the article until the filament is cut apart at checkout.

The swift tacks with plastic filament have tendencies, where articles are hung adjacently, to snag with adjacent swift tacks, undermining the display effort. Also, where the swift tacks are applied at the point of article manufacture, they tend undesirably, to become entangled with one another in the course of packaging, shipping and unpacking. Further, swift tacks can damage the articles to which they are attached and are aesthetically unappealing from a display point of view.

In commonly-assigned U.S. Pat. No. 5,334,274, applicants herein provide a method for use in belt making wherein a marketing indicator is secured with the belt at the time of the assembly of the belt blank and the belt buckle.

More particularly, in making belts having buckles of the type having a prong pivotally supported by an arm of the buckle frame, following the step of applying a belt-retaining loop member to the belt blank and buckle disposed therewith, a portion of a marketing indicator is applied to the undersurface of the belt blank, interiorly of the boundary of the subsequent stitching, thereby to be secured with the stitched assembly.

When the stitching is performed, as is customary, in an inverted disposition of the belt blank, the '274 patent practice looks to retentive application of the marketing indicator to the undersurface of the belt blank. To this end, the portion of the indicator which is disposed interiorly of the stitching, or at least a part of such portion, has an adhesive backing applied thereto for securement thereof to the belt blank. Accordingly, upon inversion of the belt blank, the indicator remains with the belt blank, without assembler assistance.

To the extent, as is discussed in detail hereinafter, that applicants' subject invention involves the display of marketing information by folding a plastic sheet member to define a loop circumscribing a member on an article, attention is also invited to the folding tail belt hanger depicted in U.S. Pat. No. 3,710,996, which discloses a hanger for the hanging of belts having buckles with prongs, wherein a plastic sheet member is folded into a loop which circumscribes a portion of the buckle frame. Marketing information, such as manufacturer's logo, size, etc., is displayed on the plastic sheet member. The loop is secured by intermating of a projection and an opening of the sheet member.

SUMMARY OF THE INVENTION

The present invention has as its primary object the provision of marketing indicator assemblies not having the above-noted disadvantages of the swift tack indicators and having more general applicability than the indicators of the '274 patent.

In attaining the foregoing and other objects, the invention provides a marketing indicator assembly comprised of an integral elongate sheet member of synthetic plastic material having first and second longitudinally spaced ends, a marketing indicator secured to the sheet member and extending therewith from the sheet member second end to a preselected location spaced from the sheet member first end, an end portion of the marketing indicator at the preselected location being not secured to the sheet member and bearing an adhesive layer, and a removable member secured to the adhesive layer and in facing relation to the sheet member.

In use of the marketing indicator assembly, the first end of the sheet member is inserted through a member secured to an article and itself defining a loop, e.g., a manufacturer's logo label secured to the rear side of a tie. A loop is now formed by the sheet member by folding the sheet member and placing its first end into registry with the preselected location. The removable member is now removed and the sheet member first end is pressed onto the adhesive layer to complete the marketing indicator assembly in looped relation with the article loop.

Where the article loop member bears information which is desired to be seen, such as the manufacturer's logo, the sheet member is formed of transparent material.

Where security, i.e., non-removability of the marketing indicator assembly from the article without evidence of removal, the marketing indicator is constituted of a material which will tear, rather than integrally separate, from the adhesive layer, providing visible indication of tapering.

In another aspect, the invention provides, in combination:

(a) an article of manufacture having secured therewith an article member defining a passage therethrough; and (b) a marketing indicator assembly comprised of an integral elongate sheet member of synthetic plastic material, a marketing indicator secured to the sheet member and extending with a first end portion of the sheet member, a second end portion of the sheet member forming a loop wherein an end of the second end portion of the sheet member is adhesively secured to the marketing indicator, the article member being disposed interiorly of the marketing indicator assembly loop.

The foregoing and other objects and features of the invention will be further understood from the following detailed description of preferred embodiments thereof and from the drawings, wherein like reference numerals identify like components throughout.

DESCRIPTION OF THE PREFERRED EMBODIMENTS

Figure 1:
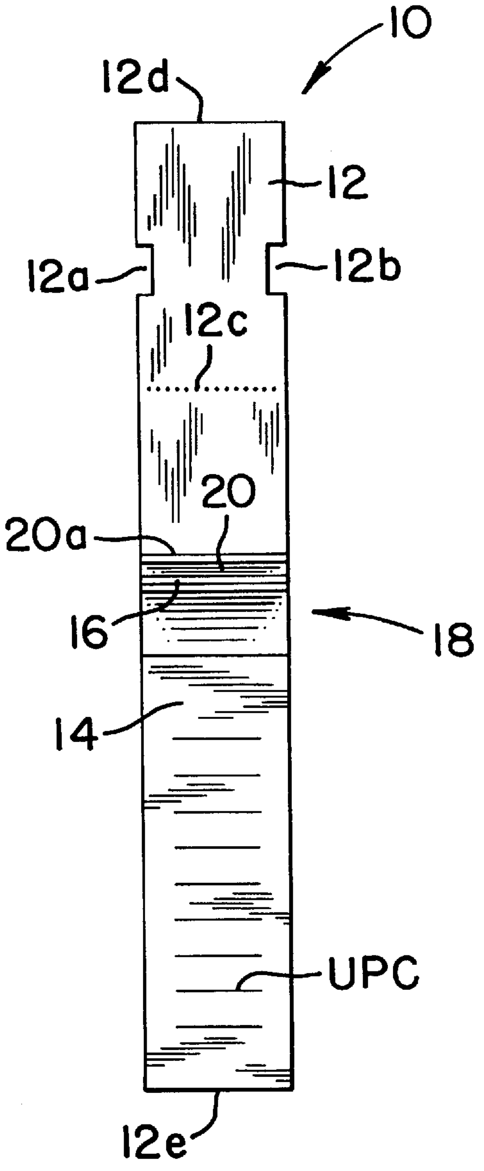
FIG. 1 is a front elevation of a marketing indicator assembly in accordance with the invention.
Figure 2:
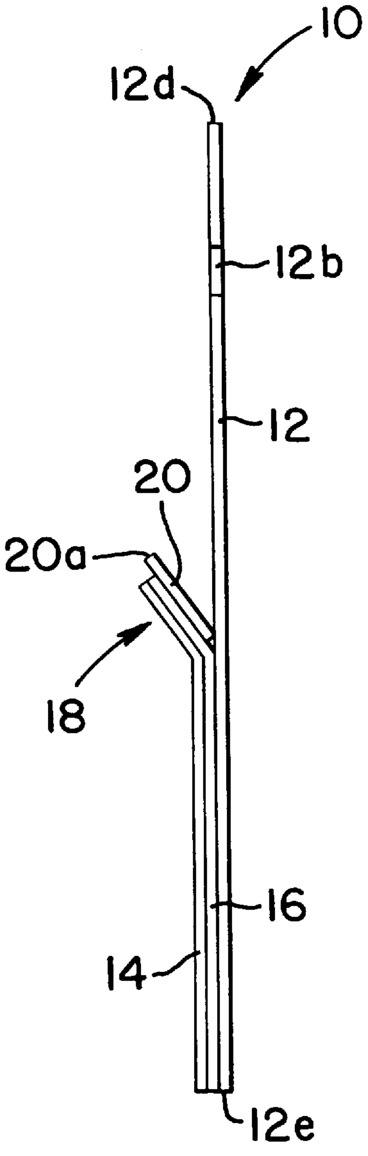
FIG. 2 is a right side elevation of FIG. 1.

Referring to FIGS. 1 and 2, marketing indicator assembly 10 comprises an integral elongate sheet member of synthetic plastic material having side openings 12*a* and 12*b*, a weakened area formed by a line 12*c* of perforations, first end 12*d* and second end 12*e*, respectively longitudinally spaced.

Marketing indicator 14, bearing marketing information shown as UPC, i.e., a sensible bar code, is secured to sheet member 12 by adhesive layer 16. As indicated, indicator 14 extends with sheet member 12 from said sheet member second end 12*e* to a preselected location spaced from the sheet member first end 12*d*. An end portion 18 of marketing indicator 14 and an end portion of adhesive layer 16, jointly indicated at 18, at the preselected location are not secured to sheet member 12, but isolated therefrom by a removable member 20 secured to adhesive layer 16 and in facing relation to sheet member 12. Member 20 is configured to have a free tab end 20*a*, facilitating removal thereof.

Figure 3:
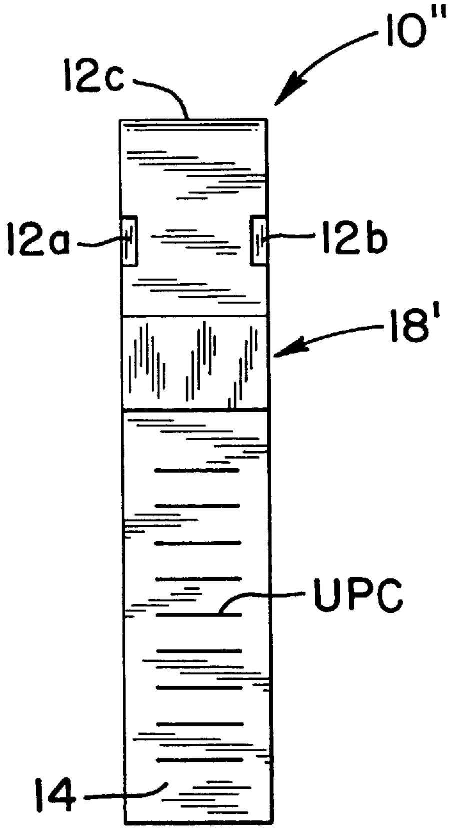
FIG. 3 is a front elevation of the FIG. 1 marketing indicator assembly in a condition wherein the top portion of the sheet member is folded on itself to form a loop and is secured to the lower portion of the assembly.
Figure 4:
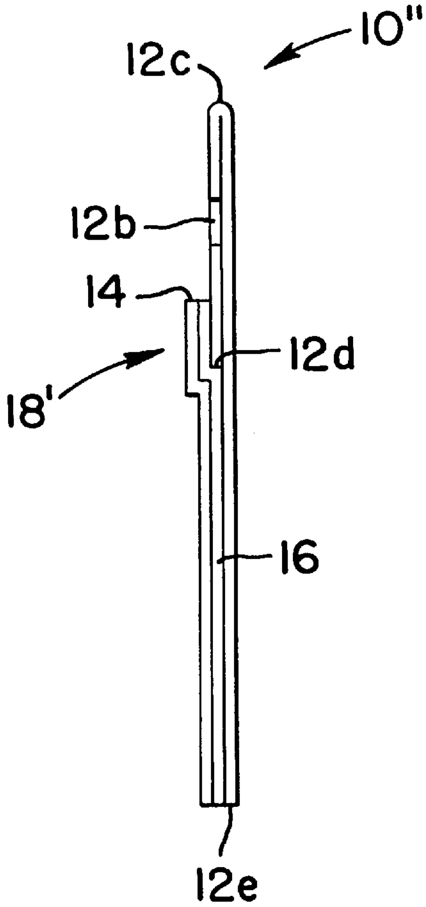
FIG. 4 is a right side elevation of FIG. 3.

FIGS. 3 and 4 show a marketing indicator assembly 10', which is reached by folding the upper portion of sheet member 12 about weakened area 12*c*, removing removable member 20 by engaging its tab 20*a* and pressing the end portion of the folded upper portion of sheet member 12 onto the now exposed end part of adhesive layer 16. It is to be appreciated that FIGS. 3 and 4 are for purposes of illustration, since assembly 10' is not placed in such completed state without an article loop being disposed with the loop so formed in the upper folded portion of sheet member 12, as is now discussed in connection with FIGS. 5 and 6.

Figure 5:
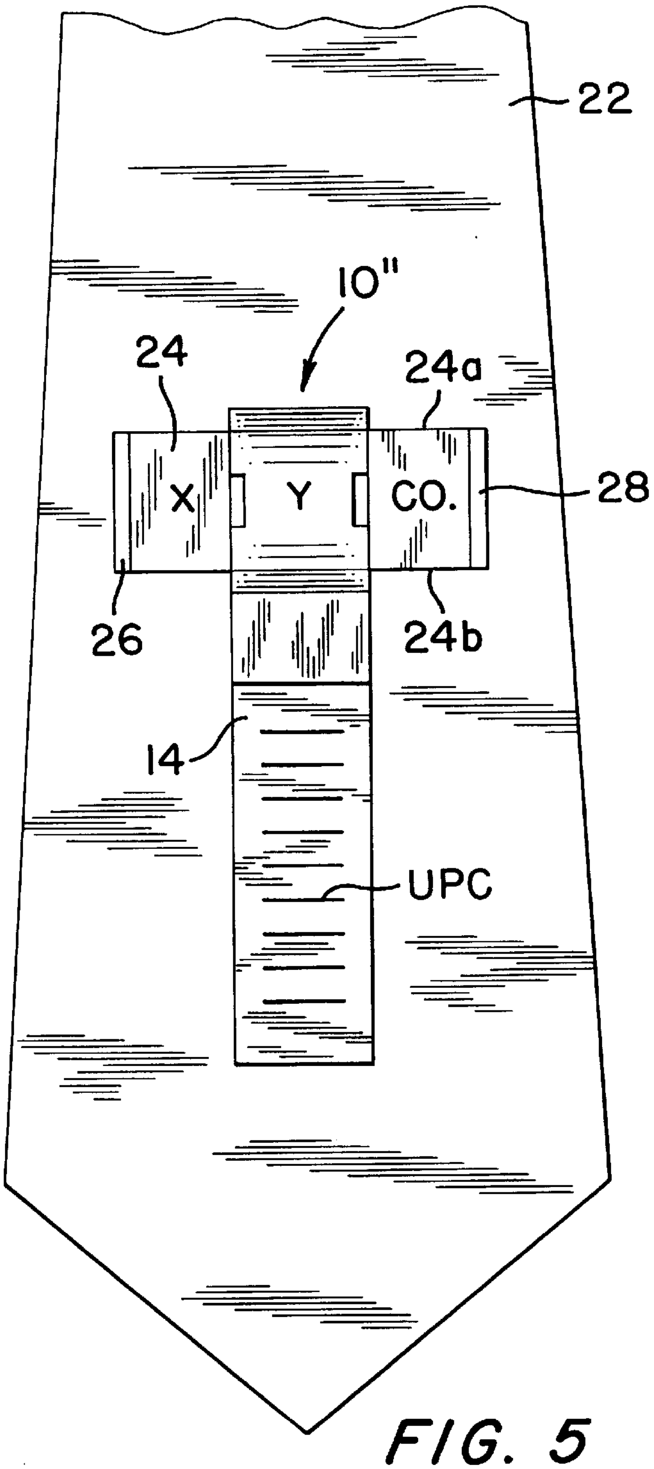
FIG. 5 shows the rear side of a tie with the marketing indicator assembly of FIG. 3 assembled with a tie manufacturer's logo member.
Figure 6:
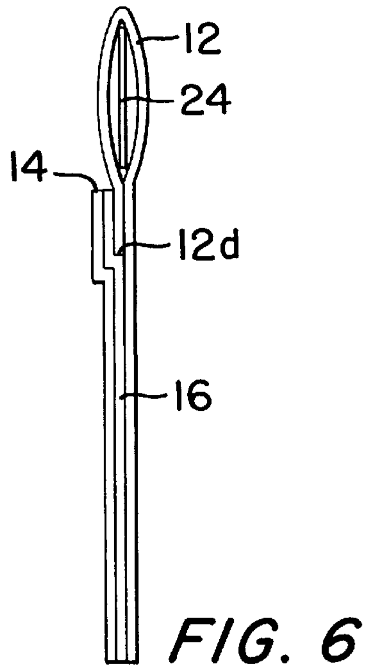
FIG. 6 is a right side elevation of FIG. 3, omitting the tie and showing the disposition of the tie manufacturer's logo member interiorly of the marketing indicator assembly of FIG. 3.

FIG. 5 depicts the rear side of tie 22, to which manufacturer's logo member 24 has been applied at the point of tie making. A free central passage exists between member 24 upper and lower ends 24*a* and 24*b*, being bounded leftwardly by stitching 26 and rightwardly by stitching 28. In effect, the tie maker has provided, as an integral part of tie manufacture, an enterable and exitable loop. Marketing indicator assembly 10", i.e., differing from marketing indicator assembly 10, in having removable member 20 removed, is assembled with the tie by the following described practice.

In use of the marketing indicator assembly, the first end 12*d* of sheet member 12 is inserted into and through the free central passage of logo member 24. A loop is now formed by the sheet member by folding the sheet member and moving the sheet member first end to registry with the preselected location. The removable member is now removed and the sheet member first end is pressed onto the now exposed adhesive layer to complete the marketing indicator assembly in looped relation with the tie logo member.

The combination thus reached will be seen to comprise:

(a) an article of manufacture having secured therewith an article member defining a passage therethrough; and (b) a marketing indicator assembly comprised of an integral elongate sheet member of synthetic plastic material, a marketing indicator secured to the sheet member and extending with a first end portion of the sheet member, a second end portion of the sheet member forming a loop wherein an end of the second end portion of the sheet member is adhesively secured to the marketing indicator, the article member being disposed interiorly of the marketing indicator assembly loop.

Where the article loop member bears information which is desired to be seen, such as the manufacturer's logo label, shown illustratively as "X Y CO", the sheet member is formed of transparent material. In the illustration, the "Y" of the logo is visible through the transparent folded sheet member. Where the article loop member does not bear information which is desired to be seen, the sheet member may be formed of opaque material.

Where security, i.e., non-removability of the marketing indicator assembly from the article without evidence of removal, marketing indicator 14 is constituted of a material which will tear, rather than integrally separate, from the adhesive layer. In this respect, applicants' preferred material for indicator 14 is generic tamper-evident paper stock, customarily used in prescription labels for medicines and the like. Such paper is comprised of very short fibers and is inherently weak and bears an adhesive backing, which constitutes applicants' adhesive layer 16. The adhesive layer has a strong adhesion to the substrate 12 and efforts to separate that bond by action on the marketing indicator results in tearing of the paper thereof.

Figure 7:
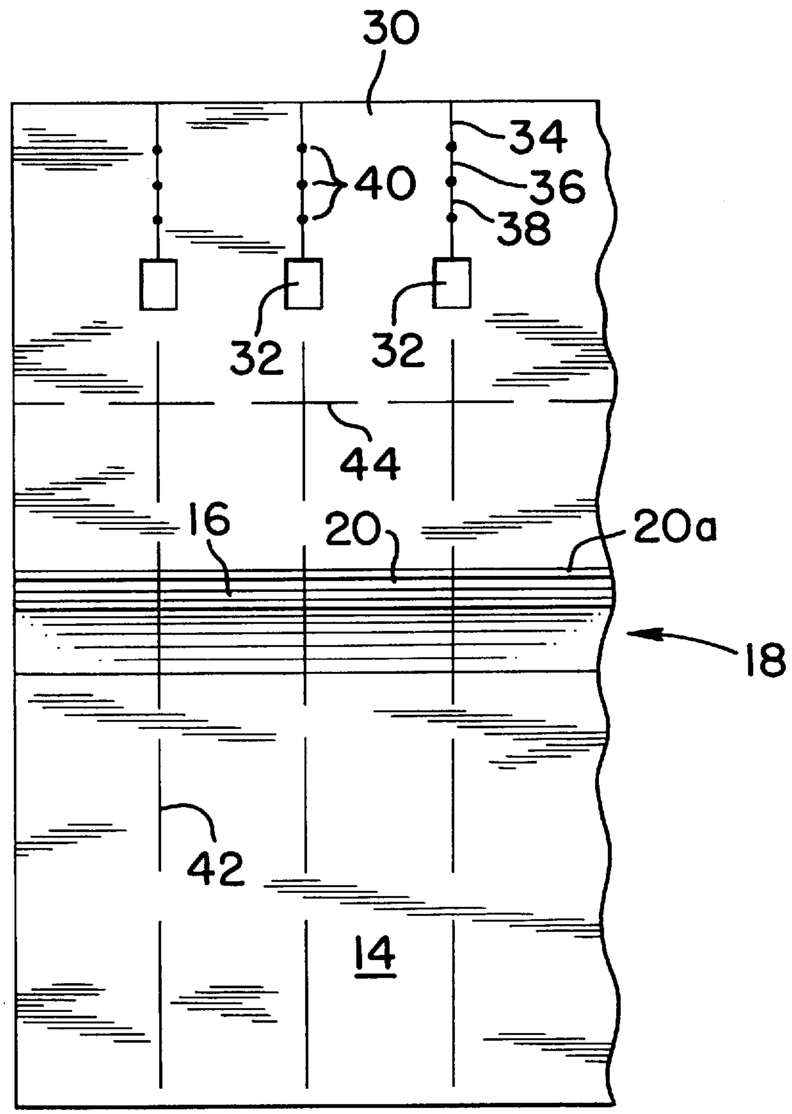
FIG. 7 is a front elevation of an expanded sheet member adapted for forming multiple marketing indicator assemblies of FIG. 1 in an interim manufacturing stage.

FIG. 7 shows a starting assembly for manufacture of a plurality of marketing indicator assemblies. Starting substrate 30 has a width which is a multiple of that of an individual marketing indicator assembly.

Substrate 30 is imprinted with marketing information by using witness holes 32 to place intended individual marketing indicator assemblies individually in registry with the printing head.

In further practice in accordance with the present invention, substrate 30, is slit or die cut as at 34, 36 and 38, leaving ticks 40 between the die cuts, the ticks being parts of substrate 30. Continuous die cuts 42 extend from witness holes 32 fully to the lower end of substrate 30. Perforations are made through substrate 30 along line 44, corresponding with perforation lines 12*c* of individual marketing indicator assemblies, shown in FIG. 1.

The structure shown in FIG. 7 will be seen to constitute an article for use in making a plurality of marketing indicator assemblies, each of a predetermined width, the article comprising a substrate having first and second ends, spaced cuts extending through the substrate at the first end thereof leaving the substrate intact therebetween, continuous cuts extending from ones of said spaced cuts to the second end of the substrate. Witness holes define portions of the continuous cuts adjacent the spaced cuts. The article further includes a marketing indicator extending with the substrate from the substrate second end to a location distal from the substrate first end, the marketing indicator being secured to the substrate and including an end portion at which is not secured to the substrate and which bears an adhesive layer. The article also includes a removable member secured to the marketing indicator end portion over the adhesive layer.

Figure 8:
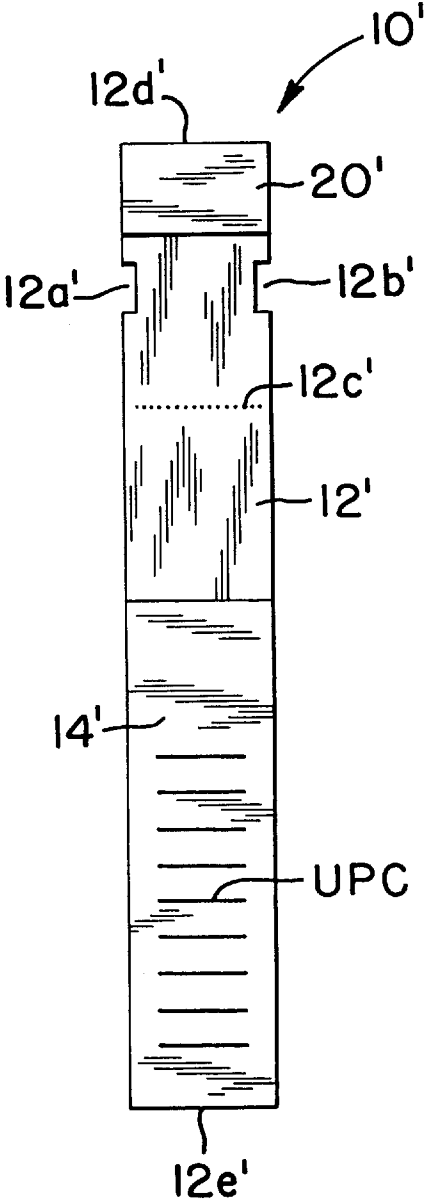
FIG. 8 is a front elevation of a second embodiment of a marketing indicator assembly in accordance with the invention.
Figure 9:
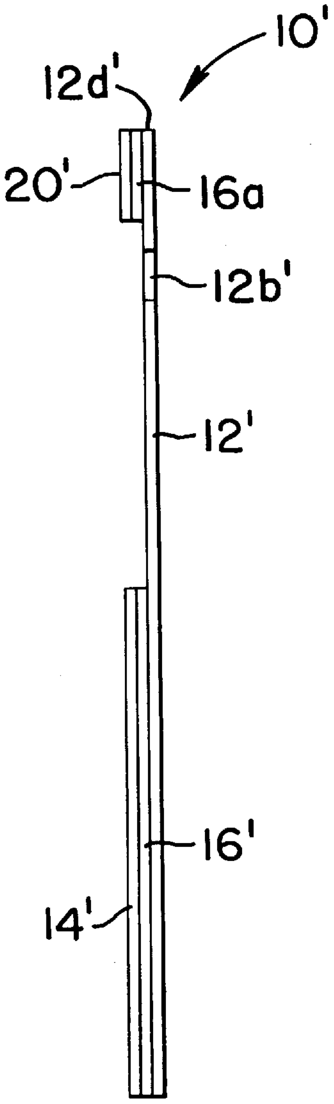
FIG. 9 is a right side elevation of FIG. 8.

FIGS. 8 and 9 illustrate a second embodiment of a marketing indicator assembly in accordance with the invention. Components counterpart to those of FIGS. 1 and 2 are shown with primed (') indications. In such marketing indicator assembly 10', upper end portions of adhesive layer 16' and marketing indicator 14' are secured to substrate 12'. At its upper end, substrate 12' has adhesive layer 16*a* secured thereto and removable member 20' overlies adhesive layer 16*a*.

In use of marketing indicator assembly 10', after the upper end thereof is passed through an article loop, member 20' is removed from its protective relation with adhesive layer 16*a*, the upper end of assembly 10' is folded into a loop and adhesive layer 16*a* is brought into registry with the upper end of marketing indicator 14' and secured thereto.

Various changes in structure to the described marketing indicator assemblies and practices connected therewith may evidently be introduced without departing from the invention. While the tie logo loop-defining member has been above discussed, the invention is to be appreciated as applicable to any article having a member secured therewith which defines a passage for insertion of the upper end of the sheet member. Accordingly, it is to be understood that the particularly disclosed and depicted embodiments and practices are intended in an illustrative and not in a limiting sense. The true spirit and scope of the invention is set forth in the following claims.

What is claimed is:

1. A marketing indicator assembly comprised of an integral elongate sheet member of plastic material having first and second longitudinally spaced ends, a marketing indicator having a first portion secured to said sheet member and extending therewith from said sheet member second end to a preselected location spaced from said sheet member first end, an end portion of said marketing indicator at said preselected location being not secured to said sheet member and bearing an adhesive layer, and a removable member secured to said adhesive layer and in facing relation to said sheet member, a single portion of said sheet member extending from said sheet member first end to said preselected location being adapted to form a continuous loop.

2. The marketing indicator assembly claimed in claim 1, wherein said sheet member is comprised of a transparent material.

3. The marketing indicator assembly claimed in claim 1, wherein said adhesive layer extends continuously from said end portion of said marketing indicator to said second end of said sheet member.

4. The marketing indicator assembly claimed in claim 1, wherein said sheet member defines a weakened area between said preselected location and said sheet member first end.

5. The marketing indicator assembly claimed in claim 4, wherein said sheet member is perforated to define said weakened area.

6. In combination:

(a) an article of manufacture having secured therewith an article member defining a passage therethrough; and (b) a marketing indicator assembly comprised of an integral elongate sheet member of plastic material, a marketing indicator secured to said sheet member and extending with a first end portion of said sheet member, a second single end portion of said sheet member forming a continuous loop wherein an end of said second end portion of said sheet member is adhesively secured to said marketing indicator said article member being disposed interiorly of said marketing indicator assembly loop, said marketing indicator being disposed outwardly of said marketing indicator assembly continuous loop.

7. The invention claimed in claim 6, wherein said sheet member is comprised of a transparent material.

8. The invention claimed in claim 7, wherein said sheet member defines a weakened area in said second end portion thereof to facilitate forming of said marketing indicator assembly loop.

9. The invention claimed in claim 8, wherein said sheet member is perforated to define said weakened area.

10. An article for use in making a plurality of marketing indicator assemblies, each of a predetermined width, the article comprising a substrate having first and second ends, spaced cuts extending through the substrate at the first end thereof leaving the substrate intact therebetween, continuous cuts extending from ones of said spaced cuts to the second end of the substrate, and marketing indicators of said predetermined width extending with the substrate from the substrate second end to a location distal from the substrate first end, the marketing indicators being secured to the substrate and each including an end portion which is not secured to the substrate and which bears an adhesive layer.

11. The article claimed in claim 10, further including printing registration holes defining portions of the continuous cuts adjacent the spaced cuts.

12. The article claimed in claim 10, further including a removable member secured to the adhesive layer.

13. A marketing indicator assembly comprised of an integral elongate sheet member of plastic material having first and second longitudinally spaced ends, a marketing indicator secured to said sheet member and extending therewith from said sheet member second end to a preselected location spaced from said sheet member first end, an adhesive layer secured to said sheet member at said first end thereof, and a removable member secured to said adhesive layer, a single portion of said sheet member extending from said sheet member first end to said preselected location being adapted to form a continuous loop.

14. The marketing indicator assembly claimed in claim 13, wherein said sheet member is transparent.

15. The marketing indicator assembly claimed in claim 13, wherein said sheet member defines a weakened area between said preselected location and said sheet member first end.

16. The marketing indicator assembly claimed in claim 15, wherein said sheet member is perforated to define said weakened area.

* * * * *